(12) United States Patent
Nakajima

(10) Patent No.: US 7,839,524 B2
(45) Date of Patent: Nov. 23, 2010

(54) ELECTRONIC DOCUMENT PRINT SYSTEM, ELECTRONIC DOCUMENT GENERATION APPARATUS AND METHOD, PRINT CONTROL APPARATUS AND METHOD, AND COMPUTER-READABLE MEDIUM

(75) Inventor: Yasuo Nakajima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1003 days.

(21) Appl. No.: 11/559,941

(22) Filed: Nov. 15, 2006

(65) Prior Publication Data
US 2007/0171465 A1 Jul. 26, 2007

(30) Foreign Application Priority Data
Jan. 25, 2006 (JP) .............................. 2006-016480

(51) Int. Cl.
*G06F 3/12* (2006.01)
*G06F 15/00* (2006.01)
(52) U.S. Cl. ..................... 358/1.15; 358/1.9; 358/1.13
(58) Field of Classification Search ................. 358/1.1, 358/1.9, 1.11–1.18
See application file for complete search history.

(56) References Cited

U.S. PATENT DOCUMENTS 6,519,048 B1 * 2/2003 Tanaka ..................... 358/1.13
2002/0064280 A1 * 5/2002 Gassho ....................... 380/201
2006/0044572 A1 * 3/2006 Nakayama .................. 358/1.1

FOREIGN PATENT DOCUMENTS

| JP | 200291711 | 3/2002 |
|---|---|---|
| JP | 2002091712 | 3/2002 |
| JP | 2002091713 | 3/2002 |

* cited by examiner

*Primary Examiner*—Thierry L Pham
(74) *Attorney, Agent, or Firm*—Gauthier & Connors LLP

(57) ABSTRACT

There is provided an electronic document print system comprising an electronic document generation apparatus and a print control apparatus. The print control apparatus included an identification information storage unit that stores output destination identification information corresponding to the print control apparatus, and a control unit that extracts output destination identification information from an obtained electronic document, causes a printing apparatus to print content data in the electronic document if the extracted output destination identification information matches the output destination identification information corresponding to the print control apparatus stored in the identification information storage unit, and performs erroneous transmission notification processing using erroneous transmission guidance data in the electronic document if no match is obtained.

9 Claims, 8 Drawing Sheets

ELECTRONIC DOCUMENT PRINT SYSTEM, ELECTRONIC DOCUMENT GENERATION APPARATUS AND METHOD, PRINT CONTROL APPARATUS AND METHOD, AND COMPUTER-READABLE MEDIUM

PRIORITY INFORMATION

This application claims priority to Japanese Patent Application No. 2006-016480, filed on Jan. 25, 2006.

BACKGROUND

1. Technical Field

The present invention relates to managing printout of electronic documents.

2. Related Art

In environments where electronic documents are distributed to or shared among various users, it is becoming common to store the electronic documents in a uniform format viewable on screens, such as PDF (Portable Document Format), in order to reduce storage cost. PDF is an electronic document format developed by Adobe Systems Incorporated in the U.S. and has been recently standardized by ISO (International Organization for Standardization).

In recent years, with enactment of the Electronic Documents Law, more and more business documents such as form documents are being stored as electronic documents.

Meanwhile, with respect to business use, form documents are still typically printed on paper. For example, as an operational method to manage orders for goods, order reception is centrally managed at a center while form documents for submitting orders needed in each region are transferred to a printing apparatus within the region, so that the form documents are printed and used there. For such uses, the data format for printing is desirably standardized, and for convenience of computerized storage and viewing, PDF can be used as the data format for printing and storage. In particular, such an operation is enabled by providing a printing apparatus capable of directly printing PDF.

Generally, form document data transferred from the center to all regions in the country have their system settings fixed by the system so that each form document is transferred to an appropriate specific output destination. Thus, measures are taken to avoid erroneous transfers. However, in cases such as where a system trouble occurs and the operation is switched to a backup system, a form document may be transmitted to an unintended output destination due to a failure caused by the switching or other causes. In consideration of such cases, it has been necessary to visually check each printed form document at each regional site where the form document is output.

SUMMARY

According to an aspect of the present invention, there is provided an electronic document print system including an electronic document generation apparatus that generates an electronic document, and a print control apparatus that receives the electronic document and causes a printing apparatus to print the electronic document, wherein the electronic document generation apparatus includes: an output destination specification unit that receives a specification of an output destination of the electronic document; and a generation unit that generates the electronic document containing output destination identification information indicating the specified output destination, content data to be output by a printing apparatus at the output destination, and erroneous transmission guidance data to be output by a printing apparatus at a site other than the output destination; and wherein the print control apparatus includes: an identification information storage unit that stores output destination identification information corresponding to the print control apparatus; and a control unit that extracts the output destination identification information from the obtained electronic document, causes the printing apparatus to print the content data in the electronic document if the extracted output destination identification information matches the output destination identification information corresponding to the print control apparatus stored in the identification information storage unit, and performs erroneous transmission notification processing using the erroneous transmission guidance data in the electronic document if no match is obtained.

BRIEF DESCRIPTION OF THE DRAWINGS

Exemplary embodiments of the present invention will be described in detail by reference to the following figures, wherein.

DETAILED DESCRIPTION

Figure 1:
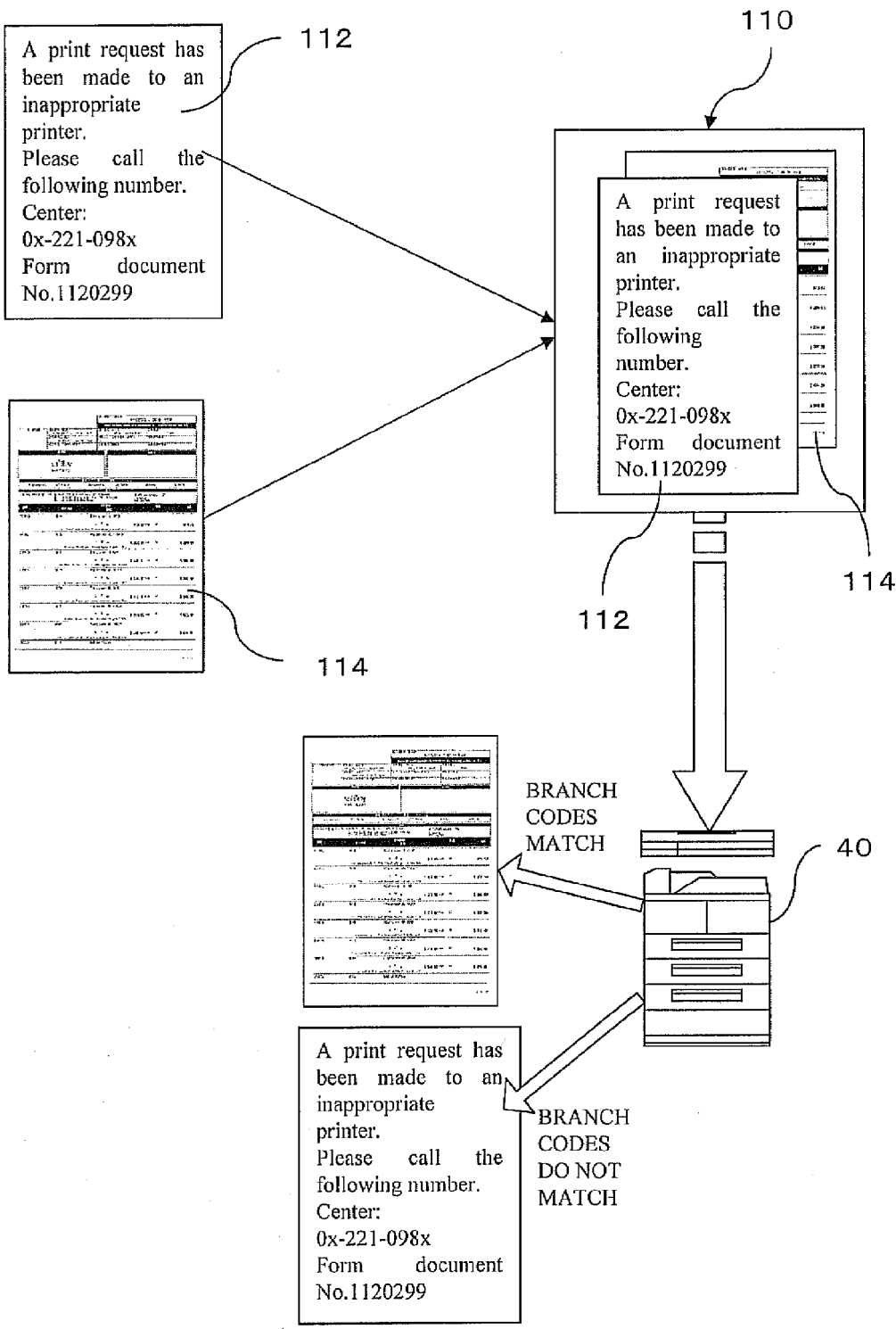
FIG. 1 is a diagram for describing a concept of print management for an electronic document in an exemplary embodiment.

First, a concept of print management for an electronic document in an exemplary embodiment will be described with reference to FIG. 1. Although printing of a form document will be described here by way of example, it will be understood by those skilled in the art that the same techniques are also applicable to printing of electronic documents other than form documents.

Here, as an example, a case is taken in which an apparatus at a center generates an electronic document containing form document information and transmits the document to a printing apparatus at a corresponding branch office to have the document printed out. The center apparatus generates an electronic document 110 including multiple layers by using a multilayer-capable format, such as PDF. The electronic document 110 includes a layer (content layer 114) containing data representing the image of a form document, and a default layer 112 containing a description indicating what action to take if the electronic document 110 is erroneously transmitted to a printing apparatus at an unintended branch office as a result of a system failure or other causes. In the illustrated example, the default layer 112 indicates that an inappropriate print request has been made, along with a description prompting the reader to contact the center. Also in this example, the default layer 112 indicates the form document number of the form document contained in the content layer 114. The center apparatus embeds into the electronic document 110 information on the branch code of a branch office intended as the output destination as attribute data for the content layer 114.

This electronic document 110 is transmitted from the center apparatus to a printing apparatus 40 placed at the branch office, along with printing attribute data that describes information on printing attributes, such as the number of copies and the paper size, in a form such as a Job Ticket.

The printing apparatus 40 at the branch office stores a branch code indicating the branch office at which the printing apparatus 40 is placed. Having received the electronic document 110 to be printed from the center, the printing apparatus 40 compares the branch code in the attribute data for the content layer 114 in the electronic document 110 with the stored branch code. If they match, the printing apparatus 40 prints the image of the content layer 114 on paper.

If the electronic document 110 destined for another branch office has arrived at the printing apparatus 40 as a result of a system failure or other causes, the branch code of the electronic document 110 does not match the branch code of the printing apparatus 40. Then, the printing apparatus 40 prints the default layer 112 on paper.

Thus, in this exemplary embodiment, if the electronic document 110 of a form document is transmitted to a printing apparatus at a branch office different from a correct destination, the form document will not be printed. Instead, a guidance document describing what action to take upon reception of an erroneous transmission is printed. Therefore, a person at the branch office that has received the erroneous transmission can take appropriate action (in the illustrated example, call the center's phone number and report the situation), by reading the printed-out guidance document.

Figure 2:
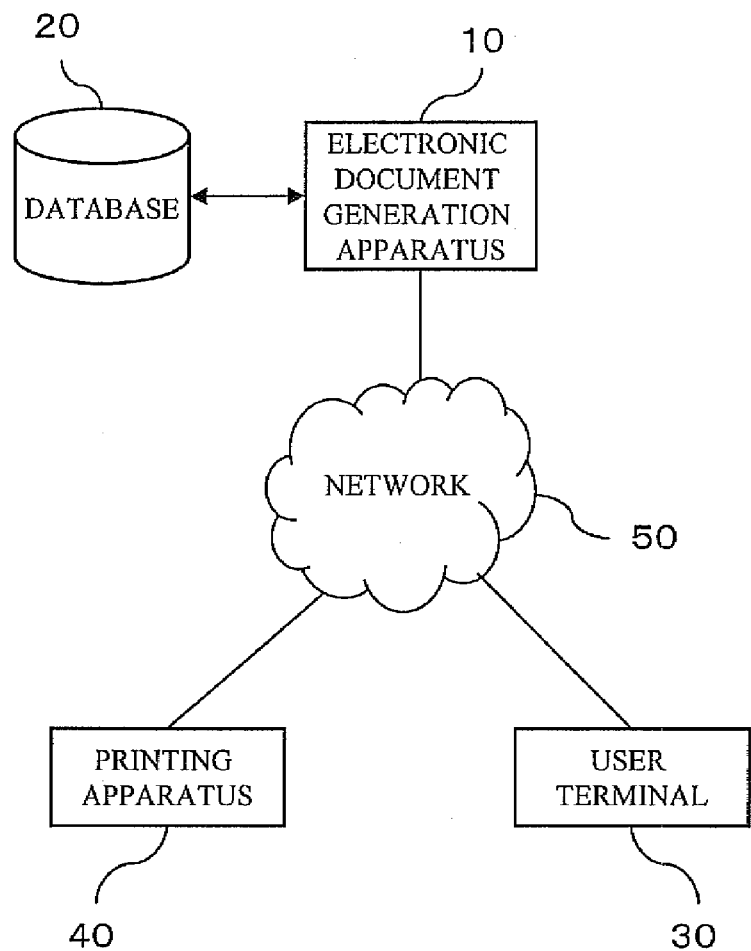
FIG. 2 is a diagram showing a schematic configuration of an electronic document print system in the exemplary embodiment.
Figure 3:
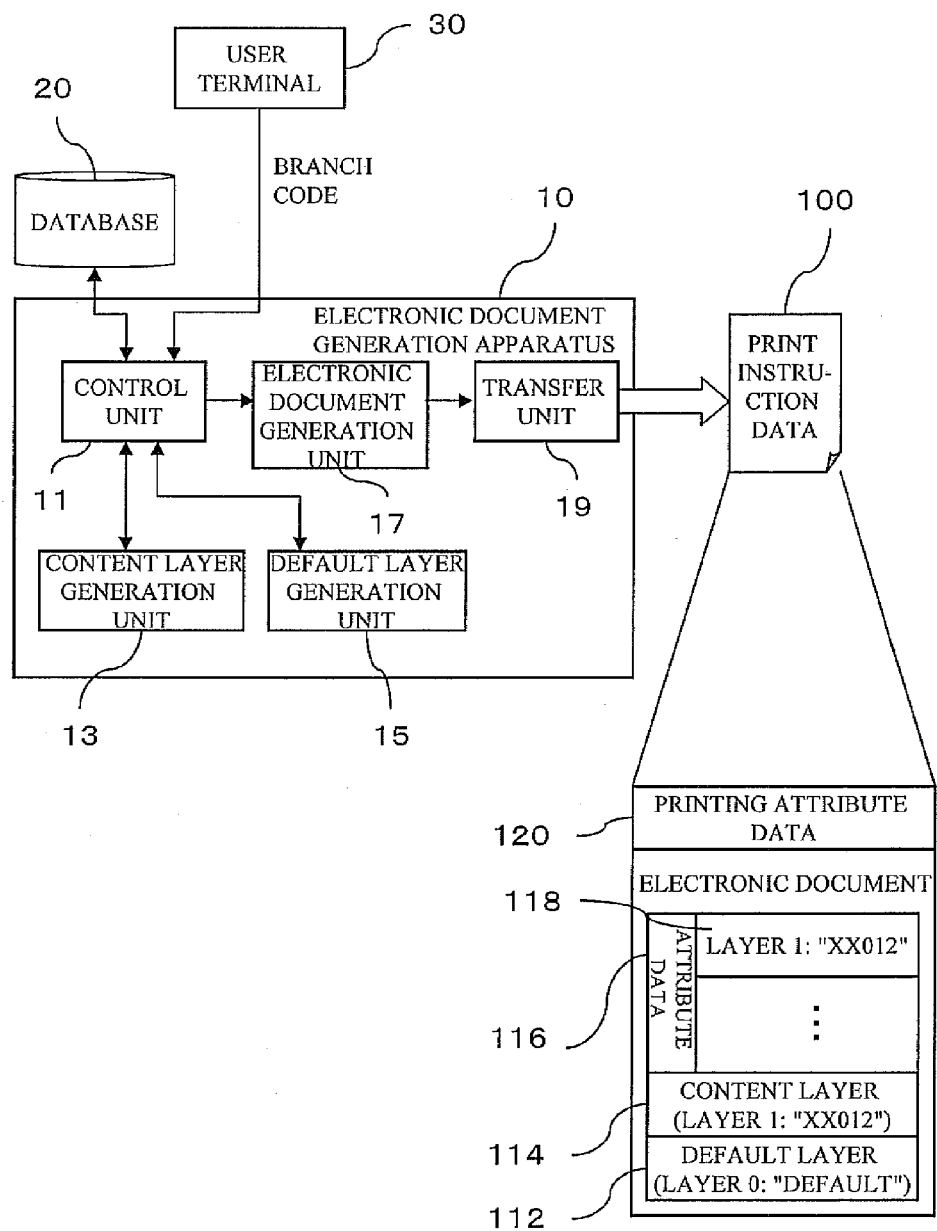
FIG. 3 is a diagram showing a configuration of an electronic document generation apparatus in the exemplary embodiment.
Figure 4:
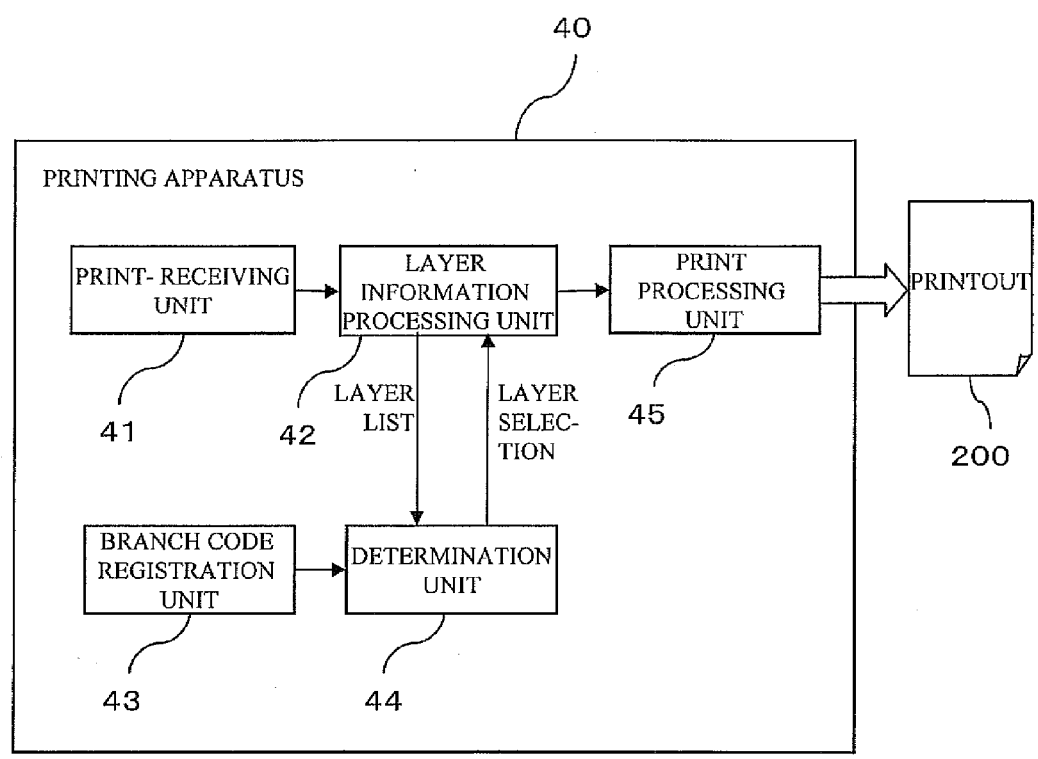
FIG. 4 is a diagram showing a configuration of a printing apparatus in the exemplary embodiment.

Now, an exemplary system configuration for implementing the above technique will be described with reference to FIGS. 2 to 4. As shown in FIG. 2, the system includes an electronic document generation apparatus 10, a user terminal 30, and the printing apparatus 40, which are connected to a network 50 such as the Internet or a LAN (Local Area Network). The electronic document generation apparatus 10 generates print instruction data including the electronic document 110 of a form document in accordance with an instruction from the user terminal 30. The electronic document generation apparatus 10 and the user terminal 30 may be placed at a center that manages orders in a company. The electronic document generation apparatus 10 is connected with a database 20. The database 20 contains form (format) data for various types of form documents, branch codes of branch offices, data on the content to be printed on the form documents to be output at each branch office (e.g., data on addresses, items, and prices on invoices), data indicating the content of guidance documents to be provided on an erroneous transmission corresponding to the types of the form documents, and other data. In response to the instruction from the user terminal 30, the electronic document generation apparatus 10 uses the information in the database 20 to generate the electronic document 110 including the content layer 114 and the default layer 112 in accordance with the instruction. The electronic document generation apparatus 10 then generates the print instruction data by adding to the electronic document 110 printing attribute data that indicate printing attributes specified by the user terminal 30. The electronic document generation apparatus 10 transmits the print instruction data over the network 50 to the printing apparatus 40 at a branch office intended as the output destination.

Having received the print instruction data from the electronic document generation apparatus 10, the printing apparatus 40 placed at the branch office checks the branch code of the content layer 114 included in the electronic document 110 in the print instruction data. Depending on whether or not the branch code matches the printing apparatus's stored branch code, the printing apparatus 40 prints a different layer as described above.

Although FIG. 2 shows only one each of the electronic document generation apparatus 10, the user terminal 30, and the printing apparatus 40, there may be more than one of any of these on the network 50.

A configuration of the electronic document generation apparatus 10 will be described in further detail with reference to FIG. 3. In this example, the electronic document generation apparatus 10 includes a control unit 11, a content layer generation unit 13, a default layer generation unit 15, an electronic document generation unit 17, and a transfer unit 19.

The control unit 11 is a unit that controls the overall processing of the electronic document generation apparatus 10. Upon receiving an instruction from the user terminal 30 to generate a form document, the control unit 11 performs processing for generating the electronic document 110 of the form document in accordance with the instruction and for transmitting the electronic document 110 to a branch office intended as the output destination. Typically, generation of form documents is often performed periodically by batch processing for form documents addressed to respective branch offices. In that case, information indicating the branch offices intended to output the form documents is transmitted from the user terminal 30 to the electronic document generation apparatus 10.

Having received this branch office specification, the control unit 11 obtains from the database 20 the form data corresponding to the type of the form documents to be transmitted to the branch office, and the data on the form document content to be incorporated into the form-document form. The control unit 11 passes these data sets to the content layer generation unit 13 to have the content layer 114 generated. The control unit 11 also assigns a unique form document number to each form document and passes the form document number data to the content layer generation unit 13. The content layer generation unit 13 incorporates the form document content and each form document number into the received form-document form to generate layer data in a predetermined data format (e.g., PDF). This is the content layer 114.

The control unit 11 obtains from the database 20 the data on the guidance document corresponding to the type of the form documents to be transmitted to the specified branch office. The control unit 11 passes the guidance document data to the default layer generation unit 15 along with the information on each form document number. The guidance document data indicate information such as a description as to what action to take and a contact phone number. The default layer generation unit 15 combines the guidance document data and the form document number to generate data in a predetermined data format such as PDF; i.e., the default layer 112.

The control unit 11 passes the generated content layer 114 and default layer 112 as well as the branch code of the output destination to the electronic document generation unit 17. The electronic document generation unit 17 combines the content layer 114 and the default layer 112 to generate a single file of the electronic document 110 in a predetermined format (e.g., PDF). In the example of FIG. 3, there is generated the multilayer electronic document 110 in which a layer 0 is the default layer 112 and a layer 1 is the content layer 114. The electronic document 110 may also include layers other than the default layer 112 and the content layer 114. As an attribute of the layer 1 (the content layer 114), the electronic document generation unit 17 incorporates a branch code 118 ("XX012" in this example) of the branch office intended to output this electronic document 110 into attribute data 116 for this electronic document.

The electronic document generation unit 17 also generates printing attribute data 120 (e.g., a Job Ticket) that indicates printing attributes specified by the user terminal 30. The electronic document generation unit 17 combines the printing attribute data 120 with the electronic document 110 to generate print instruction data 100. The generated print instruction data 100 are transmitted by the transfer unit 19 to the printing apparatus 40 at the branch office specified as the output destination.

Now, an internal configuration of the printing apparatus 40 will be described with reference to FIG. 4. The printing apparatus 40 includes a print-receiving unit 41, a layer information processing unit 42, a branch code registration unit 43, a determination unit 44, and a print processing unit 45.

The print-receiving unit 41 receives the print instruction data 100 from the electronic document generation unit 17 over the network 50. The print-receiving unit 41 passes the electronic document 110 in the received print instruction data 100 to the layer information processing unit 42. The print-receiving unit 41 may set operation parameters for the components of the printing apparatus 40 in accordance with the printing attribute data 120 in the print instruction data 100.

The layer information processing unit 42 performs processing for extracting a layer to be printed from the electronic document 110 received from the print-receiving unit 41. For this processing, the layer information processing unit 42 passes to the determination unit 44 a list of layers included in the electronic document 110. This layer list contains the attribute data for each layer.

The determination unit 44 determines whether the attribute data for each layer in the layer list contains a branch code that matches the branch code of this printing apparatus 40 registered with the branch code registration unit 43. The branch code of the branch office at which this printing apparatus 40 is placed is registered with the branch code registration unit 43 in advance by a person such as the employee who manages the printing apparatus 40. As a result of the determination, if a layer having the branch code that matches the branch code registered with the branch code registration unit 43 is found, the determination unit 44 returns layer selection information indicating that layer to the layer information processing unit 42. If a layer having the branch code that matches the branch code registered with the branch code registration unit 43 is not found (for example, if only a branch code different from the registered branch code is found, or if no branch codes are found), the determination unit 44 returns to the layer information processing unit 42 predetermined information indicating the failure to find the layer as the layer selection information.

The layer information processing unit 42 selects one of the layers in the electronic document 110 in accordance with the layer selection information sent from the determination unit 44. For example, if the layer selection information indicates the number of a certain layer, this means that the electronic document 110 includes the content layer 114 to be printed by the printing apparatus 40, and the layer number indicates that content layer 114. Therefore, the layer information processing unit 42 selects the layer indicated by the number. In contrast, if the layer selection information is the predetermined information indicating the failure to find the layer corresponding to the branch code, the layer information processing unit 42 selects the default layer 112. The layer information processing unit 42 passes the data on the layer selected in this manner to the print processing unit 45.

The print processing unit 45 includes: a processing unit that converts data on the received electronic document (in this case, the layer selected by the layer information processing unit 42) into printable data such as image data or page-description-language data; and a print engine that uses the converted data to print an image on paper. The print processing unit 45 has a conventional direct print function, so that it processes data on an electronic document not written in a page description language (e.g., a document in PDF format) to generate image data that can be handled by the print engine. The print engine produces a printout based on this image data.

Thus, if the received electronic document 110 includes a layer having a branch code that matches the branch code of the branch office at which the printing apparatus 40 is placed, the printing apparatus 40 prints the image of that layer (the content layer 114). Otherwise, the printing apparatus 40 prints the default layer 112. Therefore, if data on a form document to be printed by the printing apparatus 40 are received, the printing apparatus 40 directly prints the data. If data on a form document not intended for the printing apparatus 40 are received, the default layer 112 is printed as the guidance document indicating what action to take for the erroneous transmission. In this manner, if erroneous transmission occurs, a person at the unintended branch office can see the print result of the guide document and recognize the erroneous transmission, thereby taking action indicated in the document.

When a regular electronic document that does not include the default layer 112 and the branch code is input to the printing apparatus 40, the printing apparatus 40 has to print the electronic document in a normal manner. To realize such control, a determination may be made as to whether an input electronic document is a multilayer document. If the electronic document is not a multilayer document, the control unit 11 may print the document in a normal manner.

Alternatively, as an attribute of the default layer 112, the electronic document 110 may have predetermined identification information indicating that the layer is used for addressing an erroneous transmission. When a regular multilayer document without the default layer 112 is input, the printing apparatus 40 can recognize the absence of the default layer 112 in the document by checking the attributes of each layer. Then, the printing apparatus 40 may print a certain layer specified in the multilayer document.

In the above description, the default layer is printed upon occurrence of an erroneous transmission. Alternatively, processing other than printing may be performed using the default layer in that case.

Figure 5:
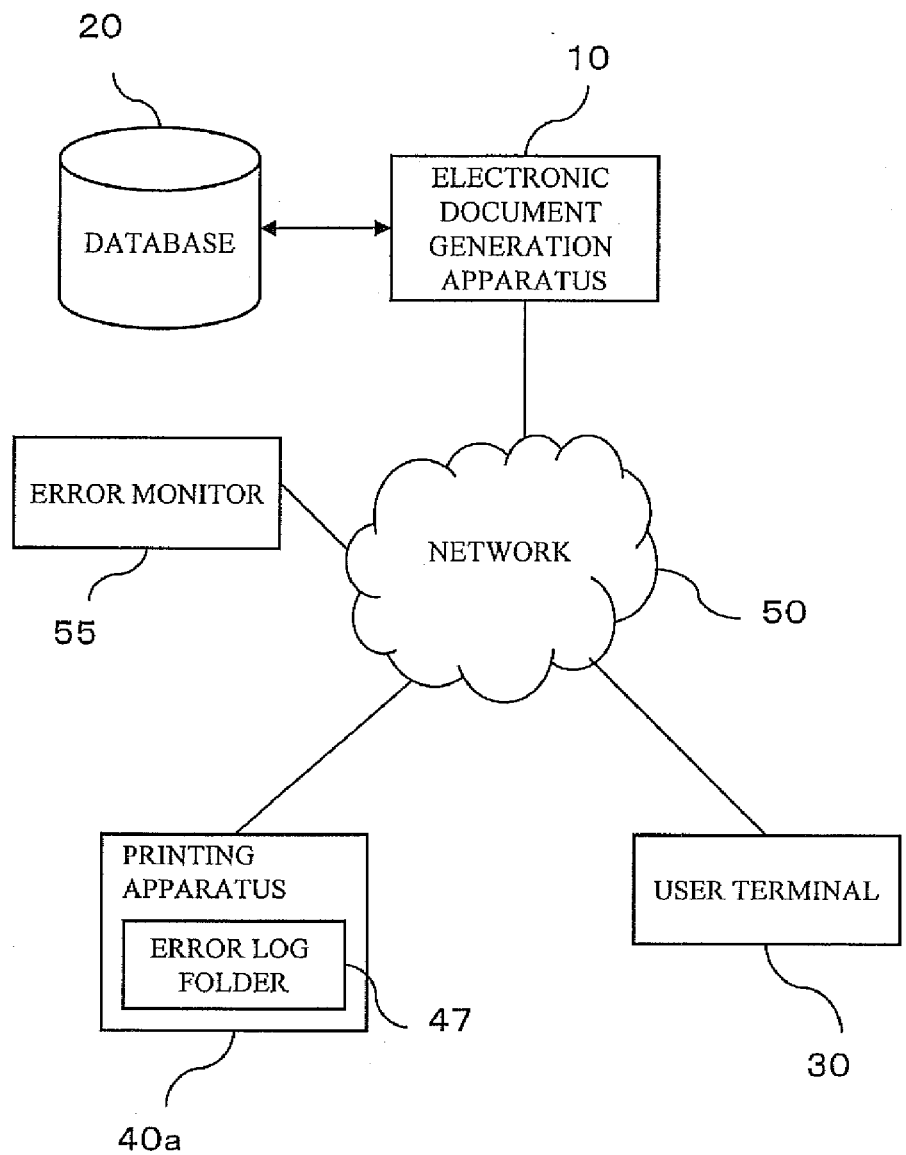
FIG. 5 is a diagram showing a schematic configuration of the electronic document print system in a modification of the embodiment.
Figure 6:
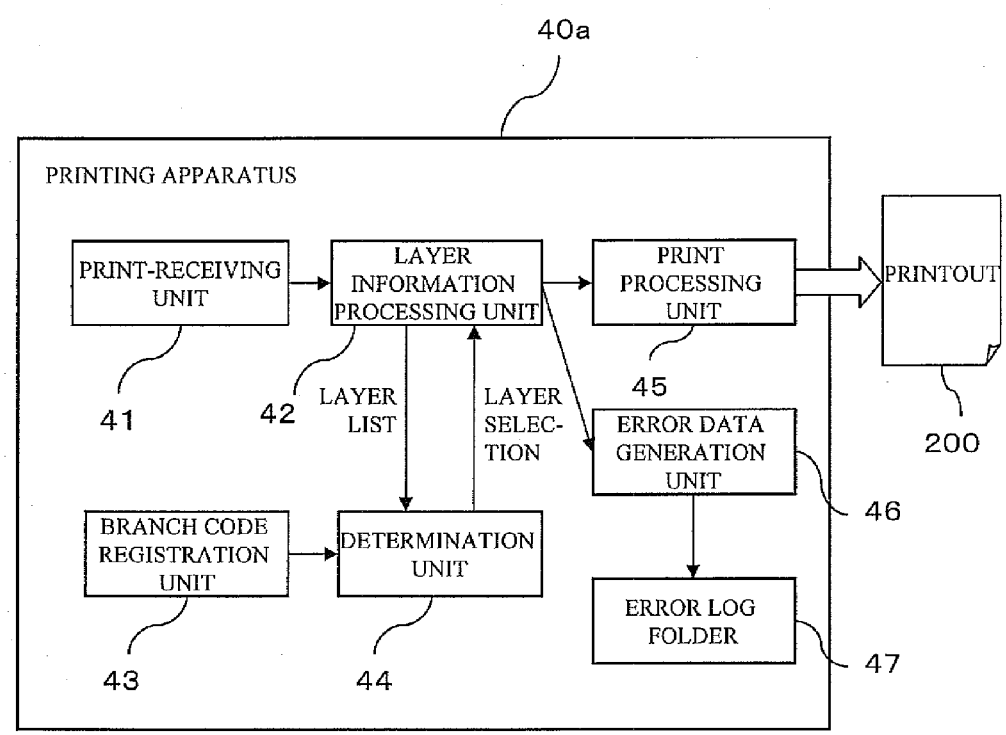
FIG. 6 is a diagram showing a configuration of the printing apparatus in the modification.

Now, a modification of this exemplary embodiment will be described with reference to FIGS. 5 and 6. In FIGS. 5 and 6, elements identical or analogous to those shown in FIGS. 2 and 4 are assigned like reference numerals, and their repeated descriptions are omitted.

The printing apparatus 40 in the above exemplary embodiment prints out the default layer 112 in the electronic document 110 if the received electronic document 110 does not have the printing apparatus's branch code. In contrast, for a printing apparatus 40a in this modification, in such a case the layer information processing unit 42 passes the default layer 112 to an error data generation unit 46. The error data generation unit 46 generates an error file that contains the layer 112 as a page and stores the error file in an error log folder 47 residing in the printing apparatus 40a. The error log folder 47 is a folder for recording error logs created in a file system of a storage device in the printing apparatus 40a, and is configured to be accessible over the network 50.

An error monitor 55 provided on the network 50 accesses the error log folder 47, for example, on a regular basis. Any error file in the error log folder 47 is obtained to perform a predetermined error-handling operation corresponding to the error file. In an exemplary error handling operation, the obtained error file is transferred by e-mail to a notified party registered with the error monitor 55 in advance, along with identification information on the source printing apparatus 40a (and possibly other attribute information on the printing apparatus 40a). Instead of being transferred by e-mail, the error file and other information may be transferred to a server indicated by a network address registered with the error monitor 55. By means of this processing, the notified party or an operator of the server (e.g., a system administrator) can become aware of the erroneous transmission of the form document to the printing apparatus 40a and take necessary action on the basis of the information on the default layer 112.

In this modification, the electronic document generation apparatus 10 may have the same functions as that shown in FIG. 2. Also in this modification, the default layer 112 does not necessarily contain the contact information.

Figure 7:
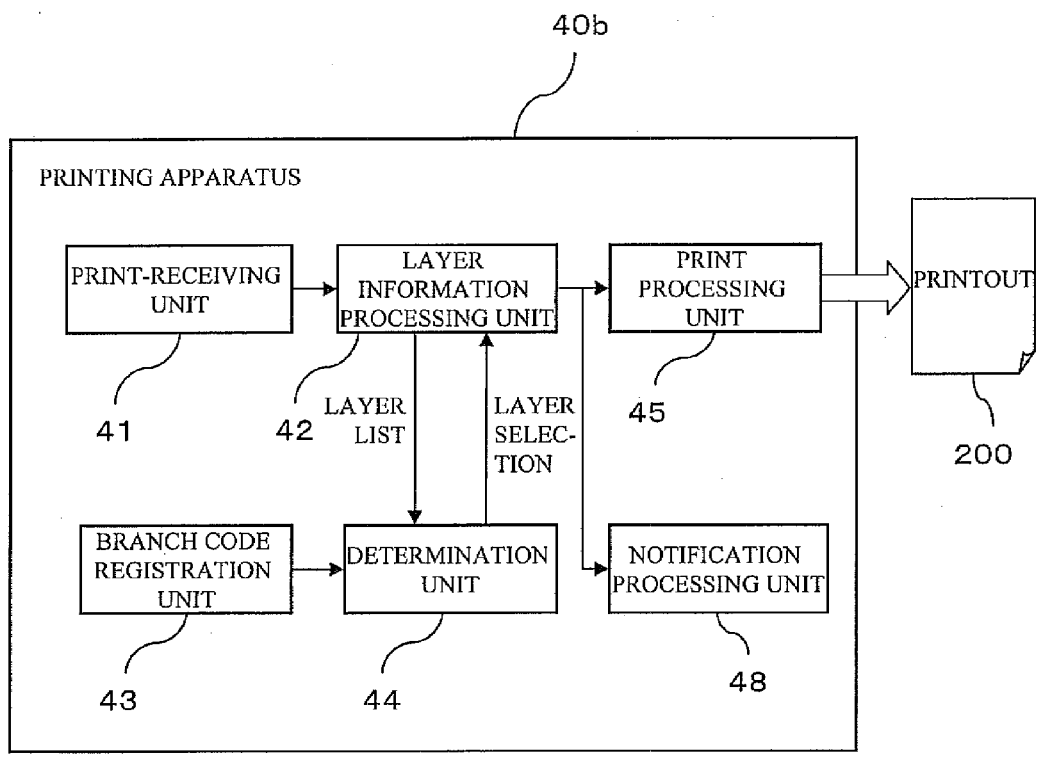
FIG. 7 is a diagram showing a configuration of the printing apparatus in another modification.

Now, a further modification will be described with reference to FIG. 7. In FIG. 7, elements identical or analogous to those shown in FIG. 4 are assigned like reference numerals, and their repeated descriptions are omitted.

In this modification, the electronic document generation apparatus 10 may have the same functions as those of the electronic document generation apparatus shown in FIG. 2. Meanwhile, a printing apparatus 40b includes a notification processing unit 48 in addition to the components of the printing apparatus 40 shown in FIG. 4.

If the branch code registered with the printing apparatus's branch code registration unit 43 is not found in the branch codes of the layers in the electronic document 110 received by the print-receiving unit 41, the layer information processing unit 42 passes the data on the default layer 112 in the electronic document 110 to the notification processing unit 48.

The notification processing unit 48 generates an error file containing the default layer 112 and transmits the file to a predetermined notified party. The address of the notified party and the protocol for notification may be registered with the printing apparatus 40b in advance.

As another example, the address of the notified party and a specified protocol used for notification may be written in the printing attribute data (e.g., Job Ticket) 120 in the print instruction data 100. In that case, the electronic document generation apparatus 10 embeds the information such as the address of the notified party into the printing attribute data 120. The printing apparatus 40b transmits the error file to the notified party contained in the printing attribute data.

As still another example, information such as the address of the notified party and the protocol for notification may be embedded into the default layer 112. The notification processing unit 48 of the printing apparatus 40b extracts the information on the notified party from the default layer 112 and uses this information to transmit the error file to the notified party.

Regardless of whether the information on the notified party is embedded into the printing attribute data 120 or into the default layer 112, the information to be embedded may be registered in advance with the database 20 (or the electronic document generation apparatus 10), or may be input to the electronic document generation apparatus 10 via the user terminal 30 by a user who has instructed the generation of the electronic document 110 (form document) In the case where the information is registered with the database 20, the information may be registered for each type of form document. Then, the information such as the notified party corresponding to the type of the form document to be generated may be embedded into the printing attribute data 120 or the default layer 112.

It is possible to perform control such that priorities are assigned to the above-described three techniques related to the error-notified party, and a technique to use is selected in order of priority. For example, the technique of embedding the information on the notified party into the printing attribute data 120 may be assigned the first priority, the technique of embedding the information on the notified party into the default layer 112 may be assigned the next priority, and the technique of using the information on the notified party registered with the printing apparatus 40b in advance may be assigned the last priority. Then, the notification processing unit 48 first checks whether or not the information on the notified party is contained in the printing attribute data 120 in the print instruction data 100. If contained, the error file is transmitted to that notified party. If not contained, a further check is made as to whether the information on the notified party is contained in the default layer 112. If contained, the error file is transmitted to that notified party. If the information on the notified party is not contained even in the default layer 112, the error file is transmitted to the notified party registered with the printing apparatus 40b.

The above-described prioritization is only an example. It is also possible to define prioritization in a combination of two of the three techniques.

In the above description, a form document is taken as an example of the electronic document. However, those skilled in the art will be able to understand that the above techniques are also applicable to electronic documents other than form documents.

According to the above exemplary embodiment and variations, it is possible to prevent content data of an electronic document from being printed out by a printing apparatus that is not set as the output destination in the electronic document. If the electronic document is transmitted to a printing apparatus that is not the output destination, the printing apparatus can use the information on the default layer 112 to provide a notification of that fact. Still, the ability of electronically viewing the electronic document on a computer screen is not lost.

The content of the default layer 112 can be varied according to the type of the form document or electronic document 110. Therefore, if the printing apparatus 40 or its user erroneously receives an electronic document that is not destined for them, the printing apparatus 40 or the user can inform the contact given or the notified party appropriate to the type of the electronic document.

In the exemplary embodiment and variations, the branch code is registered with the rewritable branch code registration unit 43 in the printing apparatus 40. Therefore, if a failure occurs in one printing apparatus 40 at a branch office, the branch code of this branch office may be registered with the branch code registration unit 43 in another printing apparatus at this branch office. This allows the latter printing apparatus to print the content data of a received electronic document. That is, in the event of a failure of a printing apparatus, the electronic document generation apparatus 10 does not need to resend the print instruction data to the same branch office, and the failure can be addressed by forwarding the originally received electronic document to another printing apparatus at the same branch office. If the output destination would be specified with the printing apparatus's unique identification information recorded in ROM or nonvolatile memory in the printing apparatus, another printing apparatus would not be able to print the content layer of the electronic document of this exemplary embodiment in the event of a failure in the printing apparatus. This exemplary embodiment contrasts with such a case.

Although in the exemplary embodiment the correct output destination of the electronic document is indicated with the branch code, any code other than the branch code capable of specifying the output destination may be used.

The techniques of the exemplary embodiment and modifications do not depend on the protocol used for transmitting the electronic document 10 between the electronic document generation apparatus 10 and the printing apparatus 40. These techniques can basically be implemented by means of any protocols. For example, even when a protocol used in usual communication is not available due to a failure or other causes, the above-described processing can be performed so long as the electronic document 110 can be transferred to the printing apparatus 40 in another way.

The system of the exemplary embodiment and variations does not require special processing for the printing apparatus 40, such as authentication, by the end-user who instructs printing of the electronic document 110.

The techniques of the above-described exemplary embodiment and variations are also applicable to a system configuration that uses two separate apparatus; that is, a print server (or print control unit) and a printer (or print engine) instead of the printing apparatus 40, 40a, or 40b. In that case, the print server may be responsible for the functions of the print-receiving unit 41, the layer information processing unit 42, the branch code registration unit 43, the determination unit 44, the portion of the print processing unit 45 that converts the electronic document data or page-description-language data into printable image data, the error data generation unit 46, the error log folder 47, and the notification processing unit 48. The image data generated by the print server are input to the printer via a dedicated cable or network and used for printing.

In the above description, PDF is used by way of example as the format of the electronic document. As an alternative to PDF, there may be used any format capable of having multiple layers in one document and capable of containing identification information such as the branch code corresponding to each layer.

Figure 8:
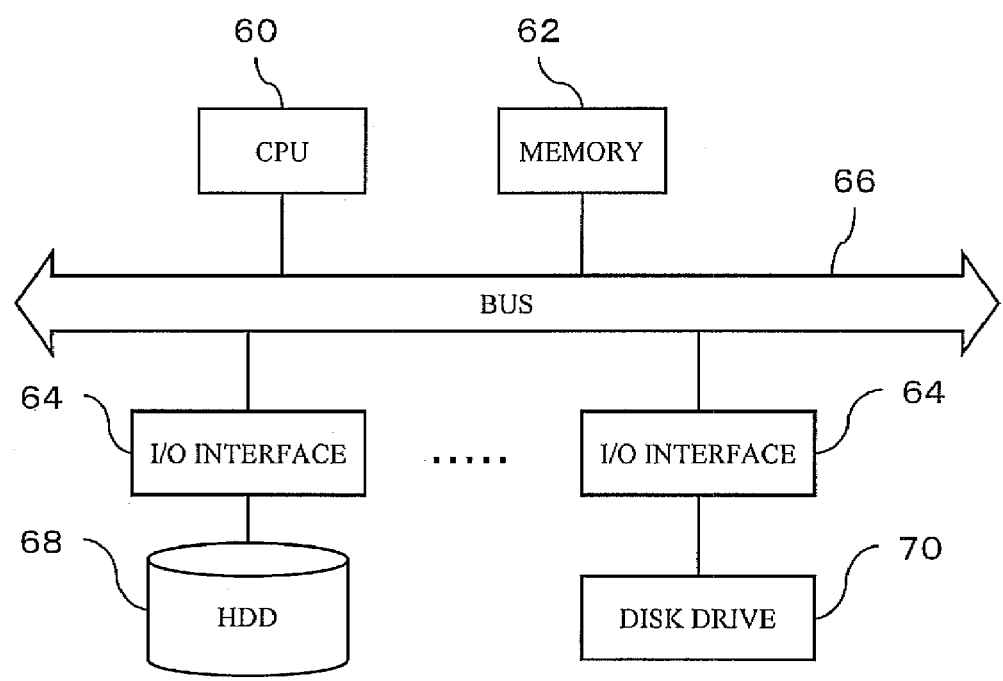
FIG. 8 is a diagram showing an exemplary hardware configuration of a general-purpose computer in which the electronic document generation apparatus is implemented.

The above-described electronic document generation apparatus 10 is typically implemented by executing, on a general-purpose computer, a program describing the functions or processing of the above-described components. For hardware, as shown in FIG. 8, the computer has circuitry in which components such as a CPU (Central Processing Unit) 60, memory (primary storage) 62, and various I/O (input/output) interfaces 64 are connected with each other via a bus 66. For example, a hard disk drive 68 and a disk drive 70 for reading removable nonvolatile recording media of various standards, such as CDs, DVDs, and flash memory, are connected to the bus 66, via the I/O interfaces 64. These drives 68 and 70 function as external storage devices for the memory. The program describing the processing of the electronic document generation apparatus 10 of the exemplary embodiment is stored in a secondary storage device such as the hard disk drive 68 via a recording medium such as a CD or DVD, or over a network, and installed on the computer. The program stored in the secondary storage device is read out to the memory and executed by the CPU, thereby implementing the processing of the exemplary embodiment. Similarly, the control mechanism of the printing apparatus 40 (the print-receiving unit 41, the layer information processing unit 42, the branch code registration unit 43, the determination unit 44, etc.) or the print server may be implemented with an architecture similar to that of the general-purpose computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An electronic document print system comprising an electronic document generation apparatus that generates an electronic document and a print control apparatus that receives the electronic document and causes a printing apparatus to print the electronic document, wherein the electronic document generation apparatus comprises: an output destination specification unit that receives a specification of an output destination of the electronic document; and a generation unit that generates the electronic document containing output destination identification information indicating the specified output destination, content data to be output by a printing apparatus at the output destination, and erroneous transmission guidance data to be output by a printing apparatus at a site other than the output destination; and wherein the print control apparatus comprises: an identification information storage unit that stores output destination identification information corresponding to the print control apparatus; and a control unit that extracts the output destination identification information from the obtained electronic document, causes the printing apparatus to print the content data in the electronic document if the extracted output destination identification information matches the output destination identification information corresponding to the print control apparatus stored in the identification information storage unit, and performs erroneous transmission notification processing using the erroneous transmission guidance data in the electronic document if no match is obtained.

2. The electronic document print system according to claim 1, wherein the erroneous transmission guidance data are data indicating what action to take upon reception of an erroneous print request.

3. The electronic document print system according to claim 2, wherein the control unit causes a wrong-destination printing apparatus to print the erroneous transmission guidance data in the electronic document as the erroneous transmission notification processing if the output destination identification information extracted from the obtained electronic document does not match the output destination identification information corresponding to the print control apparatus stored in the identification information storage unit.

4. The electronic document print system according to claim 2, wherein the control unit registers the erroneous transmission guidance data in the electronic document with an error recorder accessible over a predetermined network as the erroneous transmission notification processing if the output destination identification information extracted from the obtained electronic document does not match the output destination identification information corresponding to the print control apparatus stored in the identification information storage unit.

5. The electronic document print system according to claim 2, wherein the control unit transmits at least part of information contained in the erroneous transmission guidance data in the electronic document to a recipient specified in the erroneous transmission guidance data as the erroneous transmission notification processing if the output destination identification information extracted from the obtained electronic document does not match the output destination identification information corresponding to the print control apparatus stored in the identification information storage unit.

6. The electronic document print system according to claim 2, wherein the control unit transmits at least part of information contained in the erroneous transmission guidance data in the electronic document to a recipient registered with the control unit as the erroneous transmission notification processing if the output destination identification information extracted from the obtained electronic document does not match the output destination identification information corresponding to the print control apparatus stored in the identification information storage unit.

7. The electronic document print system according to claim 2, wherein the control unit transmits at least part of information contained in the erroneous transmission guidance data in the electronic document to a recipient indicated in printing attribute data obtained along with the electronic document as the erroneous transmission notification processing if the output destination identification information extracted from the obtained electronic document does not match the output destination identification information corresponding to the print control apparatus stored in the identification information storage unit.

8. The electronic document print system according to claim 1, wherein the electronic document is a multilayer document, in which the content data and the erroneous transmission guidance data are different layers.

9. The electronic document print system according to claim 1, wherein the output destination identification information is identification information regarding a branch office at which the printing apparatus is placed.

* * * * *